United States Patent Office 3,179,714
Patented Apr. 20, 1965

3,179,714
STABLE COATING COMPOSITIONS COMPRISING POLYEPOXIDE, CARBOXYL-CONTAINING COPOLYMER, AND TERTIARY AMINE CATALYST
Francis Joseph Brockman and Gordon H. Segall, St. Hilaire Station, Quebec, Canada, assignors to Canadian Industries Limited, Montreal, Quebec, Canada, a corporation of Canada
No Drawing. Filed Oct. 30, 1961, Ser. No. 148,701
Claims priority, application Great Britain, Nov. 16, 1960, 39,316/60
4 Claims. (Cl. 260—837)

This invention relates to improved coating compositions and, more particularly, to improved polyepoxide-containing coating compositions which form hard infusible films on heating in the presence of a basic catalyst.

Coating compositions of the above general type are now known in the art and are described, for example, in United States Patent Nos. 2,604,464, 2,604,457 and 2,798,861. They comprise essentially a vinyl or acrylic copolymer containing free carboxylic acid groups, a polyepoxide and a basic organic catalyst. Such compositions, whether pigmented or not, are applied from solutions to substrates and baked thereon at, for example, 150° C. for 30 minutes. The polyepoxide and the acid-containing copolymer react together under the influence of the catalyst and cross-link to form a rigid, thermoset, three-dimensional polymeric film.

However, it has hitherto been necessary to sell such coating compositions in two separate packages, one package containing the film-forming materials, i.e., the acid-containing copolymer and the polyepoxide, and the other package containing the catalyst and a little extra solvent, which packages are mixed by the user shortly before applying the coating compositions to the substrate. This sale in two packages has been made necessary because the viscosity of the complete compositions increase quite rapidly on storage, due to the starting of the cross-linking reaction. If the compositions had been sold as one package materials, it may well have been found that, after storage the compositions had become either gelled or too high in viscosity to be sprayed at an acceptable film thickness. Thus it has been necessary to store the filmforming materials and the catalyst separately until the time of actual use.

It is of course, desirable to provide a one package system which is can-stable, and thus reduce inventory problems and the ever present fear that a user may forget to add the catalyst before application of the coating composition to a substrate. It has now been found that certain "latent" catalysts may be used which give a permissibly slow increase of viscosity even when a single package coating composition is stored at elevated temperatures, and yet still catalyse the cross-linking reaction (under baking conditions) to give a hard finish. The resulting baked finish is particularly useful for industrial uses, such as the finishes of appliances and automobiles.

It is therefore the primary object of this invention to provide can-stable, single package coating compositions capable of cross-linking on baking into hard infusible protective films. Additional objects of the invention will appear hereinafter.

Broadly speaking, the improved coating compositions of this invention comprise essentially a carboxylic acid containing copolymer, a polyepoxide and a catalytic amount of a tertiary amine wherein each nitrogen atom is linked to three organic groups each containing at least nine carbon atoms.

The feature which distinguishes the compositions of the present invention from those of the prior art is the catalyst. As previously mentioned, it has been found that tertiary amines with three large substituent groups attached to each nitrogen atom serve as excellent catalysts for the cross-linking reaction on baking, but only very slowly catalyse the cross-linking reaction at storage temperatures and so unexpectedly give can-stable compositions. Particularly suitable large substituent groups for the nitrogen atom are the long chain fatty acid residue such as the residues from tallow, stearic or coconut acids. In general any large group containing at least nine carbon atoms is considered suitable; there may be unsaturation present in the carbon atom chain, remote from the nitrogen atom, and the chain may also be branched or have non-functional substituents, i.e., substituents that do not affect the basic character of the amine nor of themselves react with the components of the coating compositions. It is not, however, desirable to have a phenyl group directly connected to the nitrogen atom, since the basic character of the amine is affected thereby. More particularly, it is essential that all three substituents on the nitrogen atom should contain at least nine carbon atoms and it is preferred that at least one substituent should contain at least 12 carbon atoms. The three substituents need not be the same.

The acid-containing copolymers of the coating compositions of this invention are similar to and include those described in the aforementioned United States patents. In general, the carboxylic acid groups in the copolymers may either be provided by acidic monomers included in the copolymers such as the $\alpha,\beta$-unsaturated acids including acrylic, methacrylic, maleic, fumaric, crotonic and itaconic acids, or by the subsequent treatment of the formed copolymers. For example, a copolymer including an alkyl acrylate may be hydrolysed after formation to give an acid-containing copolymer. The other neutral monomers present in the acid-containing copolymers include styrene, alklated styrenes, such as $\alpha$-methyl styrene, vinyl toluene and p-isopropyl styrene, acrylate esters of alcohols of 1 to 10 carbon atoms such as ethyl, butyl and 2 ethyl-hexyl acrylates; methacrylate esters of alcohols of 1 to 10 carbon atoms such as methyl, ethyl, butyl and 2 ethyl-hexyl methacrylates, together with lesser amounts of copolymerizable monomers such as vinyl chloride and acrylonitrile. In general, to obtain good cross-linking ability with polyepoxides, it has been found that an amount of acid should be included in the copolymer equivalent to that obtained when 2% to 20% by weight of acrylic acid is copolymerized with the other monomers.

These materials are most suitably polymerized in a heated organic solvent in the presence of any of the known vinyl type initiators such as the peroxide or azotypes. Such initiators include acetyl peroxide, benzoyl peroxide, tertiary butyl perbenzoate, cumene hydroperoxide, azo-bis (isobutyronitrile) and azo-bis (isobutyrocarbonamide).

The polyepoxides used in the compositions of this invention may be of several types, but they are all characterized by having at least two epoxide groups in the molecule. The epoxide group is the three membered cyclic inner ether represented by.

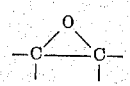

These polyepoxides include both monomeric species such as vinyl cyclohexene dioxide and polymeric species such as the known epoxide resins. The latter are generally low molecular weight condensation products of epichlorhydrin and a polyhydric alcohol or phenol such as glycerol or diphenylol propane (bis-phenol A). The epoxide resins are now a well known class of commercial materials, and it is preferred that the member selected should have an epoxide content of at least 7.5% by weight, a melting point not exceeding 75° C. and a Gardner viscosity not exceeding 1.65 poises as a 40% solution in ethylene glycol dibutyl ether.

It has been stated that the amount of acid groups in the copolymers of the coating compositions of this invention should be equivalent to that obtained when between 2% and 20% by weight of acrylic acid is included in the copolymers. The amount of polyepoxide used should be such that between 0.2 and 2.0 epoxide groups are present for each acid group, i.e., 0.2–2.0 equivalents of epoxide, based on total acid. Using commercial epoxide resins the resulting weight of epoxide resin is about 5% to 55% of the acid-containing copolymer. The amount of catalyst will generally lie in the range of $\frac{1}{10}$ to $\frac{1}{100}$ of an equivalent of the tertiary amine, based on the acid in the copolymer, but the invention is not rigidly restricted to this amount since, if lower or higher baking temperatures are used, more or less catalyst may be required (up to about $\frac{1}{5}$ to $\frac{1}{200}$ of an equivalent). The amine catalysts may be added in any form, such as its salts with, for example, acetic, formic, maleic, citric and similar acids, or also as its betane or borane derivative.

The coating compositions of this invention may suitably also include pigments, in particular titanium dioxide, and may also include the extenders, fillers, dyes and other additives known in the coating art.

The following examples, in which the parts given are by weight unless otherwise indicated, demonstrate the improved stability of the coating compositions of this invention, but they are only illustrative and are in no manner to be construed as limiting the invention.

The first four examples, a copolymer of 72 parts of vinyl toluene, 20 parts of ethyl acrylate and 8 parts of acrylic acid was chosen as a standard to demonstrate the efficiency of the latent catalysts. It was prepared by the following method:

2000 parts of xylene were heated to reflux in a stirred vessel and the following solution was run in over a period of one hour, the solution being held at reflux:

Vinyl toluene _____ 2,160 parts.
Ethyl acrylate _____ 600 parts.
Acrylic acid _____ 240 parts.
Benzoyl peroxide _____ 30 parts.
Tert. butyl hydroperoxide _____ 48 parts (of 60% sol.).

The resulting solution was refluxed for a further four hours, at which time 300 parts were distilled off. Xylene (800 parts) and butanol (150 parts) were then added, and the resin solution allowed to cool. The resulting product showed virtual complete conversion of the monomers and yielded a clear solution of 50% solid resin.

The polyepoxide chosen to illustrate the invention is described in "Epoxy Resins" by Henry Lee and Kris Neville, published in 1957 by McGraw-Hill, at page 20 et seq. It is known as "Epon 828" and contains about 20% of epoxide groups. It has an average molecular weight of from 350 to 400, being a resinous condensation product of epichlorohydrin and diphenylolpropane. "Epon 828" is a liquid at room temperature. "Epon 1001," also described in the above publication, is also suitable containing about 8% of epoxide groups and melting at 64° C.–76° C. "Epon 1001" is a resinous condensation product of epichlorohydrin and diphenylolpropane of average molecular weight of from 900 to 1,000. These epoxides are typical of those which give hard, grease resistant films. Either 1.0 equivalent or ½ equivalent of polyepoxide, based on acrylic acid, was used in all cases.

EXAMPLE 1

White enamels were prepared by grinding 135 parts of the acid-containing copolymer in 135 parts of solvent (xylene/butanol, 17/1) with 165 parts of $TiO_2$ pigment. Near the end of the grind, 30 parts of "Epon 828" were added, together with 70 parts of solvent and the catalysts in an amount equal to $\frac{1}{42}$ of an equivalent based on the acid in the copolymer. The weighed amount of the catalyst thus depended on its molecular weight. Each enamel was then diluted to spray viscosity, sprayed onto a phosphated steel panel and baked at 150° C. for 30 minutes. The resulting protective film was tested for hardness by a coin scratch test and for solvent resistance by rubbing with an acetone soaked cloth. All films were hard and none were significantly softened by the acetone rub, thus demonstrating that the true catalysed cross-linking reaction had occurred on baking.

In Table I the first three results show the viscosity increase with time during storage at 42° C. of compositions including tertiary amine catalysts outside the scope of this invention. The remaining results show the great improvement in can-stability given by the long chain tertiary amine catalysts of this invention, under identical conditions. The viscosity was measured by run-out time from a standard pipette.

*Table I*

| Catalyst | Viscosity after elapsed time in weeks | | | | |
|---|---|---|---|---|---|
| | 0 | 1 | 2 | 3 | 4 |
| Dimethylcocoamine | 29 | 40 | Gelled | (Viscosity well over 400) | |
| Dimethyl, hydrogenated tallow amine ($C_{16}$–$C_{18}$) | 28.7 | 38 | 164 | Gelled | |
| Monomethyl, di(hydrogenated tallow) amine | 31.4 | 38 | 111 | Gelled | |
| Trilaurylamine ($C_{12}$) | 30.4 | | 39 | 48 | 74 |
| Tri(hydrogenated tallow) amine | 30.8 | | 37 | 43 | 64 |
| Tricocoamine ($C_{12}$–$C_{14}$) | 32 | | 41 | 49 | 77 |

It can be seen that the third experiment, where the substituents on the nitrogen atom were two hydrogenated tallow groups and one methyl group, was not as successful as the fourth where all three substituents were the lauryl ($C_{12}$) groups. Thus it is essential to have large groups in all three positions.

EXAMPLE 2

In experiments similar to those of Example 1, only half the quantity of the polyepoxide was used. The results are given in Table II.

*Table II*

| Catalyst | Viscosity after elapsed time in weeks | | | | |
|---|---|---|---|---|---|
| | 0 | 1 | 2 | 3 | 4 |
| Dimethylcocoamine | 31.7 | 40 | 87 | Gelled | |
| Dimethyl, hydrogenated tallow amine ($C_{16}$–$C_{18}$) | 30.2 | 35 | 49 | 86 | Gelled |
| Monomethyl, di(hydrogenated tallow) amine | 28 | 31 | 36 | 43 | 60 |
| Trilaurylamine ($C_{12}$) | 29.7 | 30 | 33 | 37 | 41 |
| Tri(hydrogenated tallow) amine | 31 | 31 | 35 | 37 | 44 |
| Tricocoamine ($C_{12}$–$C_{14}$) | 31.2 | 32 | 35 | 38 | 43 |

EXAMPLE 3

Trinonyl amine was compared with dimethylcocoamine in a composition similar to those of Example 2. A different pipette was used for viscosity measurements, and a higher storage temperature reduced the time for the experiments. The results are shown in Table III.

*Table III*

| Catalyst | Viscosity after elapsed time in hours | | | | | |
|---|---|---|---|---|---|---|
| | 0 | 86 | 110 | 134 | 158 | 172 |
| Dimethylcocoamine | 37 | 84 | 93.6 | 102 | 110.8 | Gelled |
| Trinonylamine | 36 | 61.8 | 66.8 | 71.4 | 73.8 | 84.2 |

EXAMPLE 4

In a further experiment using the copolymer of Examples 1, 2 and 3 and one equivalent of "Epon 828," the acetate salt of the tri(hydrogenated tallow) amine was used as a catalyst. The composition containing this tri-fatty amine salt (1/64 of an equivalent) was very stable, giving a viscosity of 89 after 7 weeks, and when sprayed on metal as a coating, it cured excellently in a 150° C. x 30 minutes' bake, giving a hard, fully cross-linked film. Both from its performance as a coating catalyst and in its stability behaviour, the acetate salt was in every way as good as the amine itself.

EXAMPLE 5

A copolymer of 62 parts of methyl methacrylate, 30 parts ethylhexylacrylate and 8 parts acrylic acid was prepared by the method given hereinbefore. It was made into a coating composition with one equivalent of "Epon 828" and 1/42 of an equivalent of both the tri(hydrogenated tallow) amine of this invention and the prior dimethylcocoamine. The stabilities of the resulting coating compositions were as follows at 42° C.:

*Table IV*

| Catalyst | 0 | 1 | 2 | 3 | 4 |
|---|---|---|---|---|---|
| Tri(hydrogenated tallow) amine | 29.9 | 32 | 40 | 52 | 94 |
| Dimethylcocoamine | 29.3 | 62 | Gelled | | |

What we claim is:

1. A can-stable coating composition comprising (1) an acidic copolymer of an α,β-ethylenically unsaturated carboxylic acid monomer and at least one other polymerizable monoethylenically unsaturated monomer having the ethylenic group as sole reactive group, (2) an epoxidized material containing at least two 1,2-epoxide groups per molecule, and (3) as a latent cross-linking catalyst, a tertiary amine wherein the nitrogen atom is linked directly to three monovalent aliphatic hydrocarbon radicals, each containing from 9 to 18 carbon atoms.

2. A can-stable coating composition comprising (1) an acidic copolymer of an α,β-ethylenically unsaturated carboxylic acid monomer and at least one other polymerizable monoethylenically unsaturated monomer having the ethylenic group as sole reactive group, said carboxylic acid monomer being present in such an amount that the number of carboxylic acid groups provided thereby is equivalent to the number of carboxylic acid groups provided by from 2% to 20% by weight of acrylic acid, (2) from 0.2 to 2.0 equivalents, based on the carboxylic acid monomer, of an epoxidized material containing at least two 1,2-epoxide groups per molecule, and (3) as a latent cross-linking catalyst, from 0.01 to 0.1 equivalent, based on the carboxylic acid monomer, of a tertiary amine wherein the nitrogen atom is linked directly to three monovalent aliphatic hydrocarbon radicals, each containing from 9 to 18 carbon atoms.

3. A can-stable coating composition as claimed in claim 2 wherein the monovalent aliphatic hydrocarbon radicals linked to the nitrogen atom of the tertiary amine are derived from fatty acids.

4. A can-stable coating composition comprising (1) an acidic copolymer prepared by the copolymerization of a monomeric alkyl ester of an α,β-ethylenically unsaturated carboxylic acid and at least one other polymerizable monoethylenically unsaturated monomer having the ethylenic group as sole reactive group and subsequent hydrolysis of the resultant copolymer to form free carboxylic acid groups equivalent in number to the number of carboxylic acid groups provided by from 2% to 20% by weight of acrylic acid, (2) from 0.2 to 2.0 equivalents, based on the carboxylic acid, constituent of the copolymer of an epoxidized material containing at least two 1,2-epoxide groups per molecule, and (3) as a latent cross-linking catalyst, from 0.01 to 0.1 equivalent, based on the carboxylic acid constituent of the copolymer, of a tertiary amine wherein the nitrogen atom is linked directly to three monovalent aliphatic hydrocarbon radicals, each containing from 9 to 18 carbon atoms.

References Cited by the Examiner
UNITED STATES PATENTS

| | | | |
|---|---|---|---|
| 2,939,859 | 6/60 | Rumscheidt et al. | 260—837 |
| 2,949,438 | 8/60 | Hicks | 260—837 |
| 2,964,492 | 12/60 | Murdock et al. | 260—837 |
| 2,993,920 | 7/61 | Budde et al. | 260—78.4 |
| 3,048,552 | 8/62 | Fang | 260—837 |

MURRAY TILLMAN, *Primary Examiner.*

LEON J. BERCOVITZ, *Examiner.*